(12) United States Patent
Santos et al.

(10) Patent No.: US 7,958,507 B2
(45) Date of Patent: Jun. 7, 2011

(54) JOB SCHEDULING SYSTEM AND METHOD (75) Inventors: Cipriano A. Santos, Modesto, CA (US); Dirk Beyer, Walnut Creek, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1756 days.

(21) Appl. No.: 11/154,305

(22) Filed: Jun. 16, 2005

(65) Prior Publication Data
US 2006/0288346 A1 Dec. 21, 2006

(51) Int. Cl.
*G06F 9/46* (2006.01)
(52) U.S. Cl. ................... 718/102; 718/104; 718/100
(58) Field of Classification Search .............. 718/102, 718/103, 104
See application file for complete search history.

(56) References Cited

U.S. PATENT DOCUMENTS

| | | | | |
|---|---|---|---|---|
| 6,009,452 | A * | 12/1999 | Horvitz | 718/102 |
| 6,110,220 | A * | 8/2000 | Dave et al. | 716/3 |
| 6,829,764 | B1 * | 12/2004 | Cohen et al. | 718/103 |
| 6,918,116 | B2 * | 7/2005 | Ang | 718/102 |
| 6,952,828 | B2 * | 10/2005 | Greene | 718/104 |
| 7,024,671 | B2 * | 4/2006 | Yamashita | 718/102 |
| 7,165,252 | B1 * | 1/2007 | Xu | 718/102 |
| 7,472,388 | B2 * | 12/2008 | Fukunari et al. | 718/100 |
| 2002/0002578 | A1 * | 1/2002 | Yamashita | 709/105 |
| 2003/0037089 | A1 * | 2/2003 | Cota-Robles et al. | 709/1 |
| 2003/0084157 | A1 * | 5/2003 | Graupner et al. | 709/226 |
| 2004/0073673 | A1 | 4/2004 | Santos et al. | |
| 2005/0010923 | A1 * | 1/2005 | Davis et al. | 718/102 |
| 2005/0021530 | A1 | 1/2005 | Garg et al. | |
| 2005/0102398 | A1 | 5/2005 | Zhang et al. | |
| 2006/0218551 | A1 * | 9/2006 | Berstis et al. | 718/102 |

OTHER PUBLICATIONS

E. Anderson et al., "Deadline Scheduling for Animation Rendering," Hewlett-Packard Laboratories; SIGMETRICS '05 Jun. 6-10, 2005, 2 pp.
T. Kelly, "A Scheduling Problem with Deadlines and Precedence Constraints," HP Confidential, Aug. 11, 2004, 8 pp.
E. Anderson et al., "Value-Maximizing Deadline Scheduling and its Application to Animation Rendering," Hewlett-Packard Laboratories, SPAA'05 Jul. 18-20, 2005, 10 pp.
Y. Zhou et al., "An Extended Evaluation of Two-Phase Scheduling Methods for Animation Rendering," Hewlett-Packard Laboratories, Proceedings of the 2005 Workshop on Job Scheduling Strategies for Parallel Processing, Jun. 19, 2005, 16 pp.

* cited by examiner

*Primary Examiner* — Meng A An
*Assistant Examiner* — Tammy Lee (57) ABSTRACT

In at least some embodiments, a method comprises computing an initial schedule of jobs to be run on a computing system using a mathematical program and monitoring the computing system. The method also comprises, based on the monitoring, determining, using the mathematical program used to compute the initial schedule, whether the initial schedule should be re-computed.

39 Claims, 4 Drawing Sheets

JOB SCHEDULING SYSTEM AND METHOD

BACKGROUND

Batch jobs typically involve multiple jobs, each job having one or more tasks, that need to be scheduled for execution on a computing system. It may be that the computing system is only available for a certain amount of time and that all of the jobs cannot be completed within the allotted time. Decisions have to be made as to which jobs to schedule for execution on the computing system.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
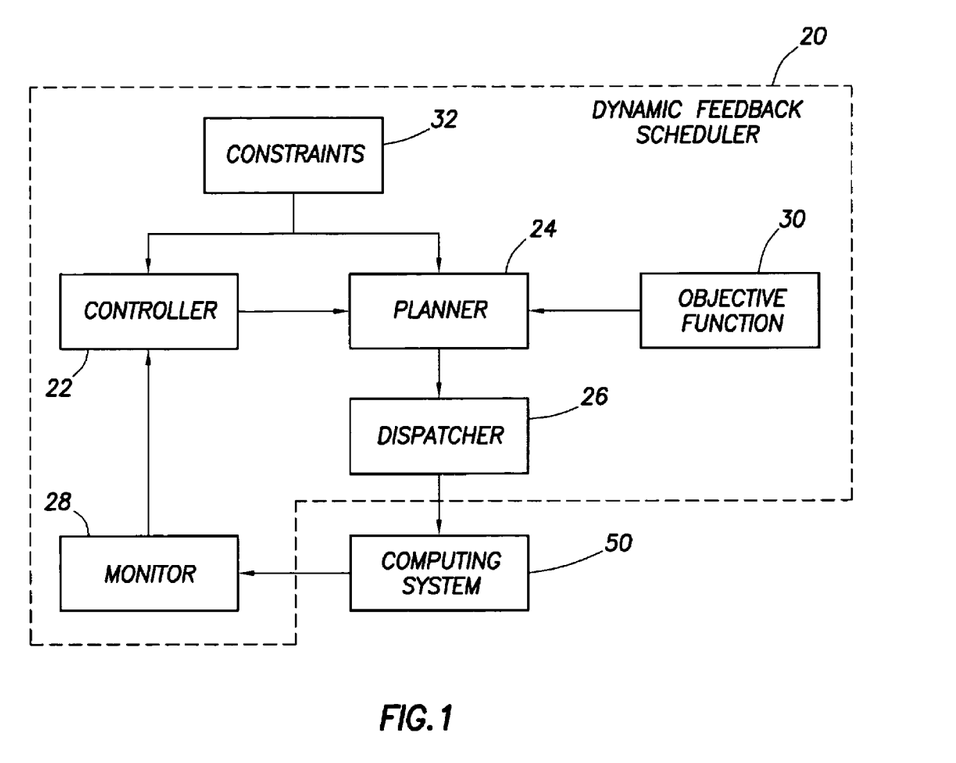
FIG. 1 shows a dynamic feedback scheduler in accordance with embodiments of the invention for scheduling jobs on a computing system.

FIG. 1 shows a dynamic feedback scheduler 20 coupled to a computing system 50. The computing system 50 may comprise one or more server computers ("servers") and each server comprises one or more processors. In some embodiments, for example, the computing system comprises clusters of processors or computers that are accessible over a local bus or over any type of network. The dynamic feedback scheduler 20 schedules and dispatches various processing jobs to the various servers of the computing system 50. In some embodiments, the jobs are scheduled and dispatched in a batch mode. The term "job" refers to any unit of processing or resource usage. In an embodiment, each job comprises one or more tasks, machine instructions, applications, etc.

As shown in FIG. 1, the dynamic feedback scheduler comprises various functional modules including a controller 22, a planner 24, a dispatcher 26, and a monitor 28. Based on an objective function 30 (or multiple objective functions) and one or more constraints 32 and other input values, the planner 24 implements a mathematical program to schedule one or more of the various jobs for execution on the computing system 50. The planner 24, in part, estimates or uses an input estimate of the completion time for the various jobs and constituent tasks when performing the mathematical program. The objective function may be to maximize a total reward associated with jobs that are timely completed. The constraints may include any suitable constraints such as cluster capacity constraints, affinity constraints, and fair share constraints which will be explained below. Although a variety of mathematical models can be implemented for the planner 24, the mathematical program generally optimizes the objective function 30. An exemplary embodiment of a suitable mathematical program will be described below. For now, the present discussion simply assumes that a suitable mathematical program is implemented in the planner 24.

In performing the mathematical program, the planner 24 may select some of a plurality of jobs for dispatching to the computing system 50, but not select other jobs. The particular choice of jobs to be dispatched on computing system 50 maximizes the objective function 30 given a time period during which the computing system can be used and based, at least in part, on an estimate of the completion time for each task or job. For example, the time period might be 10 hours meaning that the computing system 50 can be used for only 10 hours to perform the various jobs that are scheduled and dispatched. That amount of time might not be sufficient to perform all desired jobs. The planner 24 determines which jobs to include and which to exclude given the time period and based on the constraints 32 and in a way that maximizes the objective function 30. The dispatcher 26 receives a list of the jobs to be performed on computing system 50 and dispatches the jobs accordingly.

While the jobs are running on the computer system 50, the monitor 28 continuously or periodically monitors the computing system 50 and the jobs running thereon. Any one or more of a variety of aspects can be monitored such as data regarding the completion times for already completed tasks and other relevant data that can be used to improve the estimate of future job or task completion times.

Monitored data from the monitor 28 is provided to the controller 22. The controller 22 determines whether the planned schedule needs to be revised based, in at least some embodiments, on whether there is sufficient time remaining to complete all of the scheduled jobs. Conditions in the computing system 50 may have changed in a way that precludes timely completion of all jobs. For example, one or more of the servers comprising the computing system 50 may have malfunctioned. Further still, one or more jobs may have taken more time to be performed than was estimated during the schedule planning phase by the planner 24. Further, the initial estimated time for the completion of tasks may prove to have been inaccurate.

In some embodiments, the controller 22 determines whether the processing of the jobs on the computing system 50 has fallen behind or has run ahead of the originally planned schedule by more than a threshold amount of time. If the currently scheduled jobs are behind or ahead of schedule by more than a threshold amount of time (or other criteria), then controller 22 causes the planner 24 to compute a new schedule. If the current schedule has fallen behind, the new schedule, as determined by the planner 24, may exclude jobs that were previously included in the previous schedule. If the current schedule is ahead of schedule, then the newly computed schedule may include jobs that were previously excluded from the previous schedule. If a new schedule is computed, the newly scheduled jobs are dispatched by dispatcher 26 onto the computing system 50.

In at least some embodiments, the controller 22 implements the same or similar mathematical program as that implemented in the planner 24. The controller 22 uses that mathematical program to assess how well the currently running schedule is doing.

Figure 2:
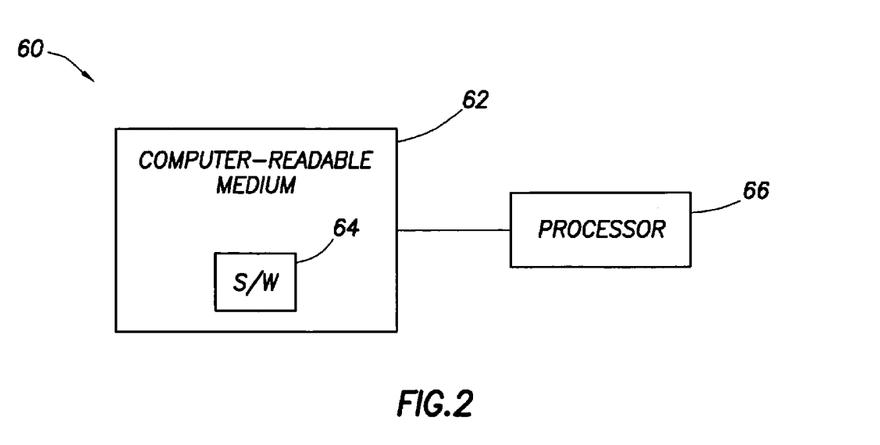
FIG. 2 shows a computer system on which the dynamic feedback scheduler of FIG. 1 can run in accordance with an embodiment of the invention.

FIG. 2 shows an exemplary embodiment of a system 60 on which the controller 22, planner 24, dispatcher 26, or monitor 28 can be implemented. The system 60 comprises a computer-readable medium 62 coupled to and accessible by a processor 66. The computer-readable medium 62 may comprise volatile storage (e.g., such as random access memory), non-volatile storage (e.g., a hard disk drive), or a combination thereof. In other embodiments, the computer-readable medium 62 comprises a removable storage medium such as an optical disc. The system 60 may be a server or other type of computer. The computer-readable medium 62 contains software 64 that is executable by the processor 66. The functionality of the various modules—controller 22, planner 24, dispatcher 26, monitor 28—may be implemented in software 64 executing on the processor 66. In some embodiments, all of the modules (i.e., controller 22, planner 24, dispatcher 26, monitor 28) are implemented in software running on a common computer. In other embodiments, one or more of the modules may be implemented in software running on separate computers.

Figure 3:
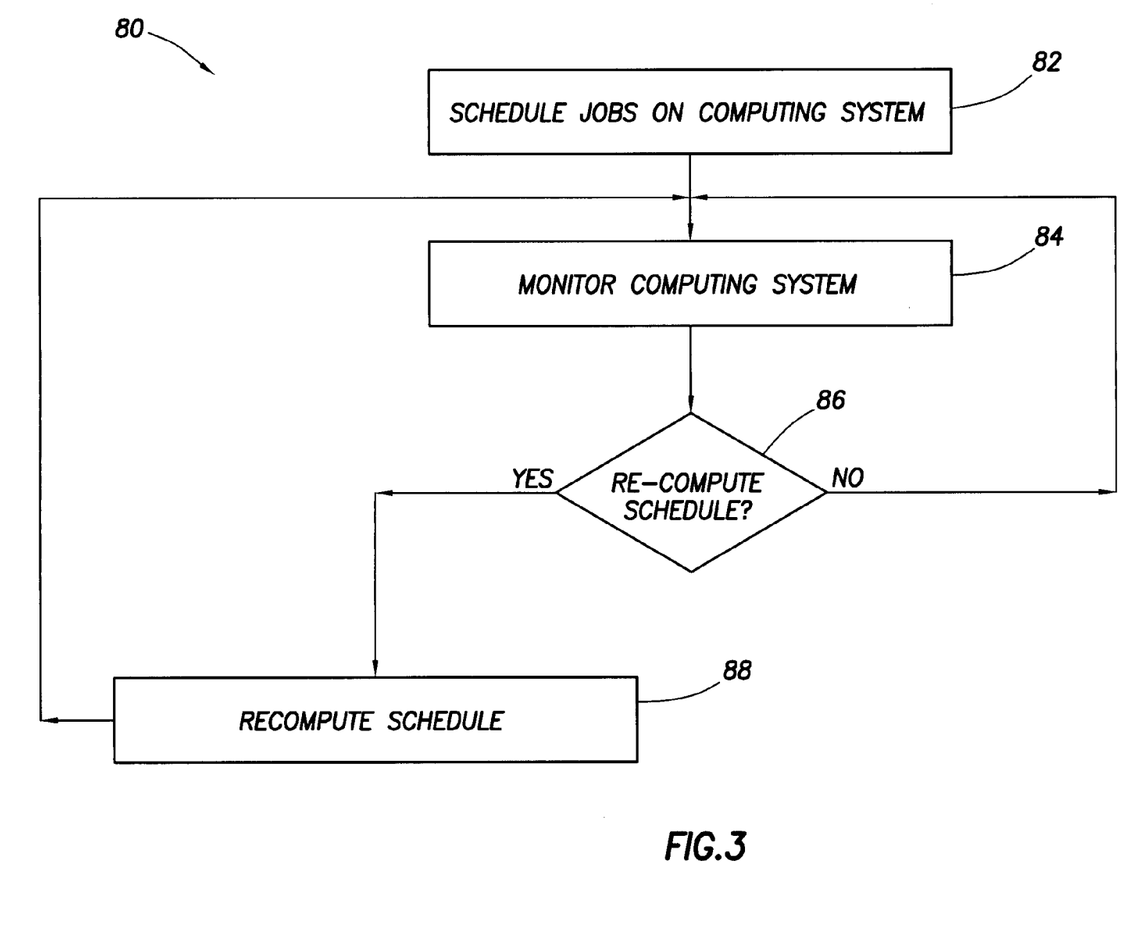
FIG. 3 shows a method performed by the dynamic feedback scheduler in accordance with embodiments of the invention.

FIG. 3 shows a method 80 in accordance with an embodiment of the invention. The method 80 comprises, at 82, scheduling jobs to run on computing system 50. This act is performed by planner 24 in FIG. 1. At 84, while the scheduled jobs are being dispatched and are running on computing system 50, the method comprises monitoring the computing system. Based on the results of the monitoring, at 86, the method comprises determining if the schedule should be re-computed. This decision step may be performed at pre-defined or programmable time intervals (e.g., once every hour). If the schedule should be re-computed, then at 88 the controller 22 causes the schedule to be re-computed by planner 24 and control loops back to 84 to continue monitoring the computing system 50. If the schedule need not be re-computed, control loops back to 104 to continue monitoring the computing system.

An example of a suitable mathematical program implemented in planner 24 to determine the initial schedule and in controller 22 to determine if the schedule should be re-computed now follows. The computer processing jobs introduced above are each made up of one or more tasks. At least some of the computer processing jobs each include a plurality of tasks and precedence constraints among the plurality of tasks.

According to another embodiment, the present invention comprises a method of dispatching tasks for execution within a multi-processor computing environment.

In embodiments of the methods of the present invention, each of the computer processing jobs includes a series of stages. Each stage includes computational tasks that may be executed in parallel. All tasks in a stage must complete before any tasks in the next stage may begin execution. In other words, the tasks in a later stage are subject to precedence constraints that require that the preceding stage's tasks finish processing before any of the tasks in the later stage may begin processing. There are no precedence constraints between tasks of different computer processing jobs. The processing of the tasks is non-preemptive in the disclosed embodiments. That is, once processing of a task begins, the task must complete its processing. Alternatively, a task may begin processing, be killed, and then be re-started at its beginning or it may be checkpointed, killed, and restarted from the checkpoint.

Figure 4:
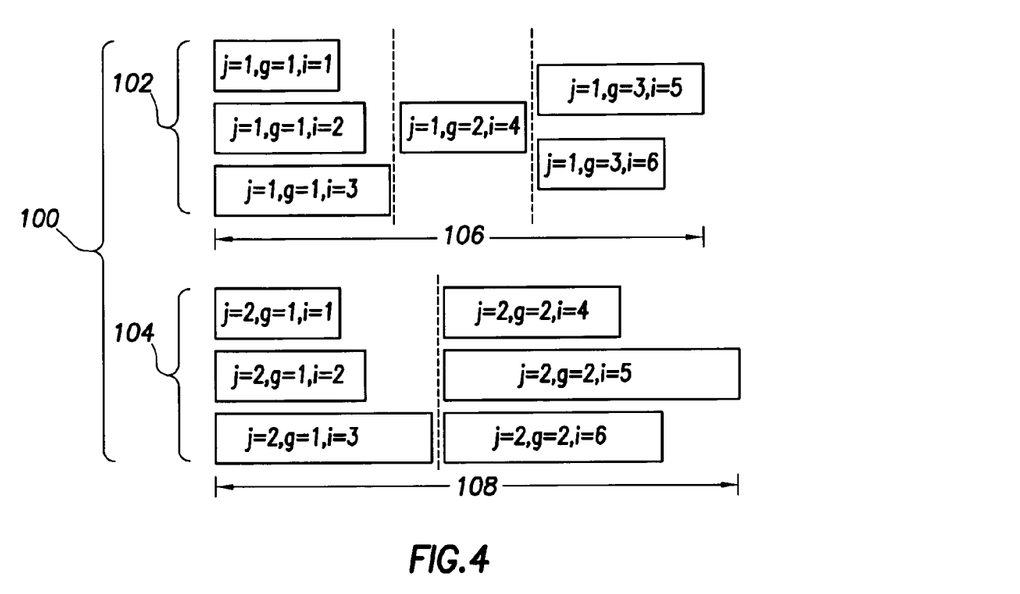
FIG. 4 illustrates an embodiment of a set of staged computer processing jobs processed by embodiments of the invention.

An embodiment of a set of staged computer processing jobs processed according to embodiments of the methods of the present invention is illustrated as a task chart in FIG. 4. The set of staged computer processing jobs 100 includes first and second jobs, 102 and 104. The first job 102 (also indicated by j=1) includes three stages, indicated by g∈{1, 2, 3}, and six tasks, indicated by i∈{1, 2, ..., 6}. The second job 104 (also indicated by j=2) includes two stages, indicated by g∈{1, 2}, and six tasks, indicated by i∈{1, 2, ..., 6}. The first and second jobs, 102 and 104, may be characterized by first and second critical path lengths, 106 and 108, which are the times required to process the first and second jobs, 102 and 104, respectively, if an unlimited number of processors are available.

The problem of scheduling the staged computing processing jobs may be described more formally as follows. The staged computer processing jobs comprise a set of jobs j∈J. Job j contains a set of stages g∈G(j). A set of tasks i in stage g of job j is denoted as S(g,j). Stages encode precedence constraints among tasks within a job. No task in stage g+1 may begin until all tasks in stage g have completed. Stages represent a special case of "series-parallel" precedence constraints or interval-based precedence constraints. Precedence constraints do not exist among tasks of different jobs.

The total expected processing time $T_j$ of job j is the sum of expected task execution times over all tasks in the job. The total expected processing time $T_j$ may be given by:

$$T_j = \sum_{\substack{i \in S(g,j) \\ g \in G(j)}} \bar{t}_{i,g,j}$$

where $\bar{t}_{i,g,j}$ is the expected execution time of task i of stage g of job j. $T_j$ is the minimum expected time to complete job j if it runs on a single processor. By contrast, the critical path length $t_{u,j}$ of job j is the amount of time that is required to complete the job on an unlimited number of processors. The critical path length $t_{u,j}$ may be given by:

$$t_{u,j} = \sum_{g \in G(j)} \max_{i \in S(g,j)} \{\bar{t}_{i,g,j}\}$$

In some embodiments, at most one task may occupy a processor at a time and tasks may not be preempted, stopped/re-started, or migrated after they are placed on processors, which promotes efficient processing of tasks. Alternatively, though perhaps less efficient, processors may process multiple tasks or tasks may be preempted, stopped/re-started, or migrated. A job completes when all of its tasks have been completed, and a "reward" is accrued if the job completes by global due time D. In any schedule of all of the jobs j∈J, each job j has a completion time $C_j$ and a completion reward $R_j$. The objective function 30 is to sequence tasks onto processors in such a way that the final schedule maximizes the aggregate reward $R_\Sigma$. The aggregate reward $R_\Sigma$ may be given by:

$$R_\Sigma = \sum_{j=1}^{J} U_D(C_j)$$

where $U_D(C_j)$ is utility for the completion time $C_j$ of job j and may be given by $U_D(C_j)=R_j$ if $C_j \leq D$ and $U_D(C_j)=0$ otherwise. Note that jobs with $t_{u,j}>D$ have $U_D(C_j)=0$. The definition of $U_D(C_j)$ may be extended to allow a lesser positive reward for jobs that complete after the due time.

The problem of scheduling the staged computer processing jobs with arbitrary completion rewards and arbitrary task execution times is "NP-hard." A particular problem is NP-hard if another problem known to be "NP-complete" can be reduced to the particular problem in polynomial time. With unit completion rewards and unit task execution times, the problem of scheduling the computer processing jobs is NP-complete. The terms "NP-hard" or "NP-complete" mean that an exact solution can only be obtained within a feasible time period, if at all, for a small problem size. Providing more computing power only slightly increases the problem size for which one can expect to find the exact solution if such a solution exists at all. The terms "NP-hard" and "NP-complete" come from complexity theory, which is well known in the computer science and scheduling disciplines. "*Computers and Intractability: A Guide to the Theory of NP-Completeness,*" *Garay and Johnson,* 1979, incorporated herein by reference.

In an embodiment, the staged computer processing jobs comprise a batch of animation processing jobs. For example, the batch of animation processing jobs may be brief excerpts of a computer-animated film that is in production. Typically, each of the brief excerpts is processed in a series of stages which must be processed in a particular order. For example, the series of stages may begin with simulation of physical movement followed by model baking, then frame rendering, and concluding with film clip assembly.

Other computer processing jobs have a similar staged structure in which stages include tasks that may be executed in parallel and later stages are subject to precedence constraints that require tasks in an earlier stage to complete processing before the tasks of the later stage may begin processing. Examples include protein sequence matching, certain classes of fast Fourier transform computations, petroleum exploration workloads, and distributed data processing.

More generally, the computer processing jobs comprise a plurality of tasks in which later tasks are subject to precedence constraints imposed by earlier tasks and in which some tasks may be executed in parallel. Such computer processing jobs may be characterized as a set of DAGs (directed acyclic graphs) in which nodes represent tasks, edges represents precedence constraints, and each DAG represents a computer processing job. Each of the DAGs has an associated critical path length $t_{u,j}$, which is the amount of time that is required to complete the job on an unlimited number of processors.

Figure 5:
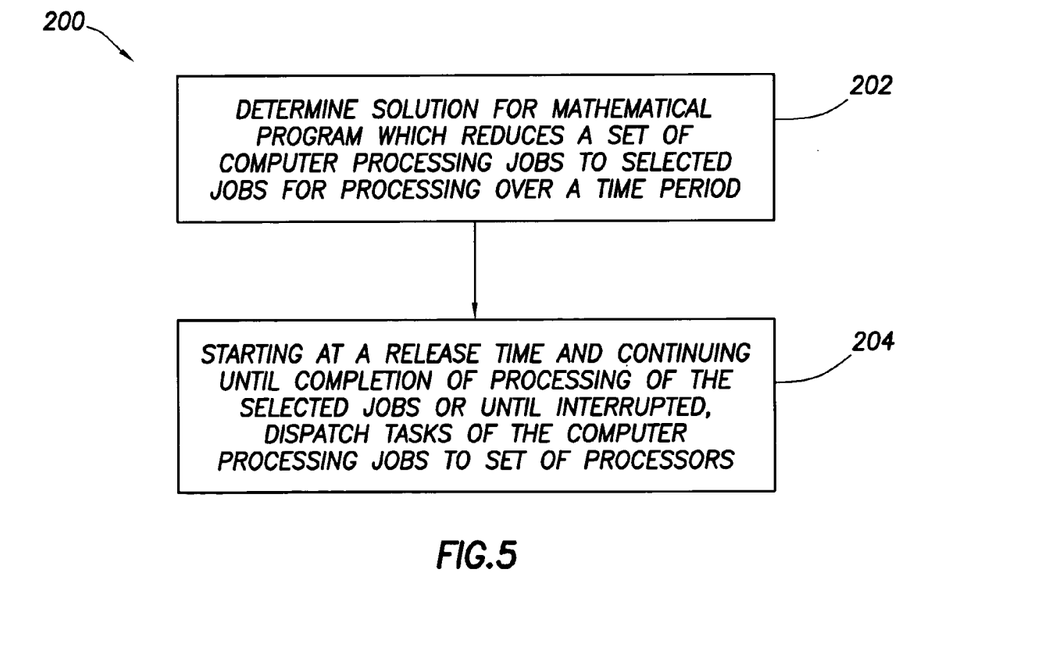
FIG. 5 shows a method of scheduling computer processing jobs in accordance with embodiments of the present invention.

An embodiment of a method 200 of scheduling computer processing jobs of the present invention is illustrated as a flow chart in FIG. 5. The method 200 begins with a first step 202 of determining a solution for a mathematical program that reduces a set of computer processing jobs to selected jobs for processing over a time period (unless all of the jobs can be completed in the allotted time period, D). Each of the computer processing jobs includes one or more tasks. Each of some of the computer processing jobs includes a plurality of tasks and precedence constraints among the plurality of tasks. The time period starts at a release time and ends at a due time (e.g., a deadline, D).

The method 200 comprises a second step 204 of dispatching the tasks of the selected jobs to a set of processors in the computing system 50. The second step 204 starts at a release time and continues until completion of the selected jobs or until it is interrupted.

In an embodiment, the mathematical program comprises an objective of maximizing a completion reward for the selected jobs and one or more capacity constraints. The one or more capacity constraints ensure that a sum of expected total processing times for the selected jobs is within a processing capacity for the set of processors.

The mathematical program may also include fair share constraints which assure that at least some of the computer processing jobs of each submitter of a group of submitters are included in the selected jobs. For example, if the job submitters are teams of artists and the jobs are computer animation processing jobs, the fair share constraints assure that some of each teams' jobs are processed. The fair share constraints may be implemented as hard constraints. For example, the hard constraints may be implemented as hard fractions, where each submitter receives their fraction of the processor time. Alternatively, the hard constraints may impose ranges of processor times on the submitters (e.g., a first submitter is to receive between 10% and 30% of the processor time, a second submitter is to receive between 8% and 25% of the processor time, and so forth). Further still, the fair share constraints may be implemented as soft constraints. For example, the soft fair share constraints may allow relaxation of the hard fractions while imposing penalty terms which reduce the completion reward, if fair share constraints are violated.

The mathematical program may be expressed mathematically as follows. Let binary decision variable $x_j=1$ if job j is selected and $x_j=0$ otherwise. P is the number of processors. The problem may be given by mathematical expressions (1) and (2) below.

$$\text{Maximize} \sum_{j=1}^{J} x_j R_j \tag{1}$$

$$\text{subject to} \sum_{j=1}^{J} x_j T_j \leq r * P * D \tag{2}$$

The summation in equation (1) assumes that all selected jobs can be scheduled, regardless of the selected jobs' critical path lengths $t_{u,j}$. The product P*D in the right-hand side of equation (2) is the total amount of processor time available between t=0 and t=D (i.e., the available processing capacity). A selection parameter r allows selection of a set of jobs whose total processor time is less than or greater than the total available. The final schedule that results from task sequencing may achieve less than 100% utilization, because precedence constraints sometimes leave no assignable task. Therefore, in some embodiments the selection parameter r is set to slightly less than 1. Since jobs with $t_{u,j}>D$ have $U_D(C_j)=0$, they may be discarded before applying a solution technique to equations (1) and (2).

The formulation of the problem described by equations (1) and (2) is a classic "0-1 knapsack" problem, one of the well-studied NP-complete combinatorial optimization problems. The 0-1 knapsack problem admits both pseudo-polynomial-time exact solutions and fully-polynomial-time approximation schemes. A wide range of solution techniques are available, such as any of a variety of greedy algorithms or a Dynamic Programming (DP) by profits technique. Commercially available solvers such as CPLEX, CONOPT, or OSL can be employed to solve the mathematical program.

A first greedy algorithm considers jobs in non-increasing order of a ratio of completion reward to total processing time $R_j:T_j$, selecting jobs until selecting an additional job violates equation (2).

A second greedy algorithm sorts the jobs by the ratio of completion reward to total processing time $R_j:T_j$ and selects jobs in decreasing order of $R_j:T_j$ until selecting an additional job violates the right-hand side of equation (2). The jobs that have been selected may be denoted as a first set $z^G$. The second greedy algorithm determines an alternative solution by finding the job having a maximum completion reward $R_j$ which also has a total processing time $T_j$ less than or equal to the right-hand side of equation (2). The set denoting the alternative solution may be designated as a second set $z^{max}$. The second greedy algorithm returns the set selected from the first and second sets, $z^G$ and $z^{max}$, which has the maximum completion reward.

In a third greedy algorithm, for each job j, consider all jobs with completion reward less than or equal to the completion reward $R_j$ excluding job j and employ the second greedy algorithm with a revised knapsack capacity that is the right-hand side of equation (2) less the total processing time $T_j$ of job j. This returns a pre-solution set $z_j^G$ for each job j. Next, find the job j having the maximum value of the sum of the completion reward $R_j$ and Reward($z_j^G$), and return the solution set of the union of job j and the pre-solution set $z_j^G$.

The DP by profits technique is only slightly more sophisticated than the greedy algorithms, but it generally guarantees an optimal solution of equations (1) and (2) if it runs to termination. An implementation requires $O(J\Sigma_{j=1}^J R_j)$ time and memory; more complex implementations can reduce both requirements. The DP by profits technique can also be used as a fully-polynomial approximation scheme simply by scaling completion rewards.

In an alternative embodiment, the knapsack formulation further comprises affinity constraints. The affinity constraints ensure that tasks from a particular job are confined to at most a particular cluster of processors (i.e., tasks from the same job are not assigned to a different cluster of processors). Preserving affinity can sometimes improve the performance of network caches serving the clusters of processors. In some embodiments, the knapsack formulation may also or alternatively comprise the fair share constraints, which are discussed above and in more detail below.

In an embodiment, the mathematical program is a Mixed Integer Program (MIP), which may be solved using a commercially available solver such as CPLEX, CONOPT, or OSL. Similar to the DP by profits solution for the knapsack problem, the MIP and an appropriate solver generally guarantee an optimal solution if run to termination. A commercially available solver may also be used to solve the knapsack problem; and, if run to termination, provides an optimal solution. The MIP and the appropriate solver generally provide a feasible solution and a conservative estimate of the lower bound of an optimal solution. In an embodiment, the MIP includes decision variables, input parameters, constraints, and an objective function. The decision variables include selection decision variables and placement decision variables. The selection decision variables indicate which of the jobs are to be included in the set of jobs that are dispatched for execution on the computing system. The placement decision variables indicate which of the jobs are assigned to which cluster of processors.

In an embodiment, the constraints comprise cluster capacity constraints, affinity constraints, and fair share constraints. The cluster capacity constraints ensure that assignments of the jobs to the clusters of processors are not expected to exceed available processor time for each of the clusters of processors. As discussed above, the affinity constraints ensure that tasks from a particular job are confined to at most a particular cluster of processors. The fair share constraints assure that at least some jobs for all users or groups of users are processed. The objective comprises maximizing total completion reward of jobs processed between the release time and the due time.

A more detailed description of an embodiment of a MIP of the present invention is described as follows. The MIP employs indices and sets as listed in Table 1.

TABLE 1

| Indices and sets | Description |
| --- | --- |
| $\psi \in \Psi$ | Set of users, groups of users, or a combination thereof |
| $j \in J(\psi)$ | Set of jobs from user or group of users $\psi$ |
| $k \in K$ | Cluster of processors that share file systems and memory |
| $p \in P(k)$ | Set of processors at cluster k |
| k(p) | Denotes the corresponding cluster k for processor p |
| $i \in S(g, j)$ | Set of tasks i of stage g of job j |
| $g \in G(j)$ | Set of stages g for job j |

Input values and derived parameters for the MIP are listed in Table 2. The completion reward $R_j$ of job j has some value if job j is completed by the due time. Otherwise, it is zero. Alternatively, the completion reward $R_j$ may be reduced by a penalty if job j is not completed by the due time. As defined previously, the total expected processing time $T_j$ of job j may be given by:

$$T_j = \sum_{\substack{i \in S(g,j) \\ g \in G(j)}} \bar{t}_{i,g,j}$$

where $\bar{t}_{i,g,j}$ is the expected processing time of task i of stage g of job j, and S(g,j) is the set of tasks comprising stage g of job j. The critical path length $t_{u,j}$ of job j represents the minimum amount of time required to process job j with an infinite number of processors and may be given by:

$$t_{u,j} = \sum_{g \in G(j)} \max_{i \in S(g,j)} \{\bar{t}_{i,g,j}\}.$$

Lateness $L_j$ of critical path of job j is given by $L_j$=max(0, $t_{u,j}$−D). The cluster capacity $H_k$ may be given by $H_k$=D*|P(k)|. Extra capacity $\Delta_k$ at cluster k may be given by $\Delta_k$=δ*|P(k)|. Total processing time W between the release time and the due time may be given by $$W = \sum_{k \in K} H_k.$$

TABLE 2

| Parameters | Description |
|---|---|
| D | Time available between release time or present time and due time |
| $R_j$ | Completion reward for job j if it is finished on time |
| $T_j$ | Total processing time of job j |
| $t_{u,j}$ | Critical path length of job j |
| $LC_j$ | Job lateness cost per unit of lateness of critical path |
| $L_j$ | Lateness |
| Cent | Cost per unit time of lateness at any cluster |
| $H_k$ | Processing time capacity at cluster k |
| $\Delta_k$ | Extra capacity at cluster k |
| $f_\psi$ | Percentage of total processing time allocated to user or group of users $\psi$ over a period of time, where $\sum_{\psi \in \Psi} f_\psi = 1$ |
| W | Total processing time available between release time and due time |
| r | Selection parameter |
| $\tau_\psi$ | Consumption of time by team $\psi$ |

The mathematical program determines the decision variables which include the selection decision variables, the placement decision variables, and an extra time decision variable. The selection decision variables indicate which of the jobs are to be included in the subset of jobs executed by computing system 50 and may be given by:

$$z_j = \begin{cases} 1 & \text{job } j \text{ is selected} \\ 0 & \text{otherwise} \end{cases}$$

The placement decision variables indicate which of the jobs are assigned to which of cluster of processors and may be given by:

$$y_{j,k} = \begin{cases} 1 & \text{cluster } k \text{ process all tasks of job } j \\ 0 & \text{otherwise} \end{cases}$$

The extra time decision variable indicates the extra time consumed by the cluster k of processors and may be given by:

$$0 \leq x_k \leq \Delta_k$$

In an embodiment, the objective function 30 seeks to maximize the completion reward less any penalties for completion of processing jobs beyond the due time. The objective function may be given by:

$$\text{Maximize} \sum_{j \in J} (R_j - LC_j * L_j) z_j - \text{cent} * \sum_{k \in K} x_k$$

The constraints 32 comprise the cluster capacity constraints, the affinity constraints, and the fair share constraints. The cluster capacity constraints ensure that assignments of the jobs to the clusters of processors are not expected to exceed available processor time for each of the clusters of processors and may be given by:

$$\sum_{j \in J} T_j * y_{j,k} \leq r * H_k + x_k$$

The affinity constraints ensure that jobs are assigned to no more than one of the clusters of processors and may be given by:

$$\sum_{k \in K} y_{j,k} = z_j$$

In an alternative embodiment, the affinity constraints are soft constraints. For example, the affinity constraints may provide a reward for preserving affinity and a penalty for violating affinity. An embodiment of affinity constraints which provide a reward for preserving affinity and a penalty for violating affinity employs a penalty variable $v_j$ and a reward variable $u_j$, which may be given by:

$$v_j \geq 0$$

$$u_j = \begin{cases} 1 & \text{provide reward for preserving affinity} \\ 0 & \text{otherwise} \end{cases}$$

The affinity constraints employing the penalty variable $v_j$ and the reward variable $u_j$ may be given by:

$$\sum_{k \in K} y_{j,k} = z_j + v_j$$

which forces the penalty variable $v_j$ to a value of zero if affinity is maintained or forces the penalty variable $v_j$ to a positive value is not maintained. A logical constraint ensures that the reward variable $u_j$ reaches an appropriate value and may be given by:

$$v_j \leq (1-u_j)*|K|$$

where K is the total number of clusters. The logical constraint forces the reward variable $u_j$ to a value of zero if the penalty variable $v_j$ is greater than zero. If the penalty variable $v_j$ is zero, the logical constraint forces the reward variable $u_j$ to a value of one. In this embodiment, reward and penalty terms are added to the objective function, which may be given by:

$$\text{Maximize} \sum_{j \in J} (R_j - LC_j * L_j) z_j -$$

$$\text{cent} * \sum_{k \in K} x_k + \sum_{j \in J} u_j * \text{reward} - \sum_{j \in J} v_j * \text{penalty}$$

where reward is a unit reward for meeting affinity and penalty is a unit penalty for violating affinity.

The fair share constraints assure that at least some jobs for all users or groups of users are processed. The fair share constraints may be implemented as hard constraints, either as a hard fraction or a range of fractions, or as soft constraints. The fair share constraints implemented as hard fractions may be given by:

$$\sum_{j \in J(\psi)} T_j z_j \geq f_\psi * W - \tau_\psi$$

The fair share constraints implemented as soft constraints may allow violation of either the hard fractions or the range of fractions while imposing penalty terms which reduce the completion reward. Fair share constraints that assign different factions to different users or groups of user may be referred to as weighted fair share constraints as opposed to un-weighted fair share constraints that provide equal fractions to users or groups of users.

In an embodiment, following the first step 202 (FIG. 5) of the method 200 and prior to the second step 204, a simulation of execution of the selected jobs on the processors is performed to determine whether simulated performance completes at about the due time. The simulated performance may exceed the due time because the knapsack problem formulation and the MIP do not account for possible delays in dispatching of tasks to processors caused by precedence constraints or by delays imposed by a dispatching policy while the simulation does account for such delays. Based upon results of the simulated performance, the selection parameter r may be adjusted and the mathematical program could then be solved again to provide a revised set of selected jobs. In an embodiment, the simulation is performed iteratively. The iterative simulations may complete upon reaching a stable selection parameter r. Alternatively, the iterative simulations may complete after a selected number of iterations.

Figure 6:
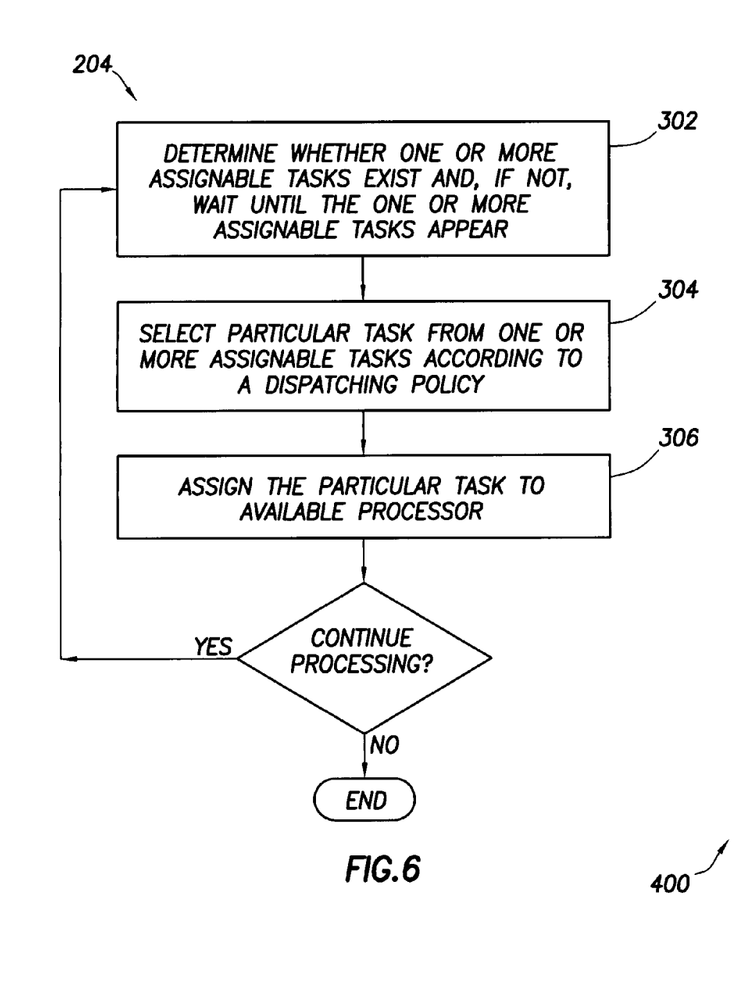
FIG. 6 illustrates a method of dispatching tasks in accordance with embodiments of the invention.

An embodiment of the second step 204 of dispatching the tasks of the selected jobs to the set of processors is further illustrated as a flow chart in FIG. 6. The step 204 starts at the release time and continues until completion of the selected jobs or until interrupted. Interruption may occur under a variety of circumstances including reaching the due time. For each processor that becomes an available processor, the second step 204 begins with a first sub-step 302 and, as appropriate, continues with second and third sub-steps, 304 and 306.

In the first sub-step 302, a determination of whether one or more assignable tasks exist for assignment to the available processor is made. If no assignable task exists, the available processor waits until the one or more assignable tasks appear. The one or more assignable tasks are the task or tasks of the selected jobs that await a processor assignment, that do not await satisfaction of at least one of the precedence constraints, and that are not precluded from the processor assignment by a dispatching policy. Dispatching policies that preclude otherwise assignable tasks from being assigned to processors are referred to as delay dispatching policies. For example, one such delay dispatching policy may stop accepting tasks from jobs that have yet to have had any tasks assigned to processors as the due time approaches. This assures that jobs that are currently being processed have more available processors making it more likely that execution of these jobs completes by the due time or as soon as possible following the due time. Dispatching polices that do not preclude otherwise assignable tasks from being assigned to processors are referred to as non-delay dispatching policies. Various embodiments of dispatching policies are discussed in more detail below.

In the second sub-step 304, a particular task is selected from the one or more assignable tasks according to the dispatching policy. In the third sub-step 306, the particular task is assigned to the available processor.

The dispatching policy implemented in planner 24 is selected from dispatching policies listed in Table 3.

TABLE 3

| Dispatching Policy | Description |
| --- | --- |
| Longest Critical Path First (LCPF) | Select the assignable task from the job having the longest critical path $t_{u,j}$ |
| Critical Path Algorithm (CPA) | Select the assignable task that is on critical path to exit node of single precedence DAG of all jobs |
| Random task first (RANDOM) | Select from the assignable tasks at random |
| Job identifier order (FIRST) | Select the assignable task from the job having lowest job identifier number |
| Job priority order (PRIORITY) | Select the assignable task from the job having highest priority |
| Shortest total processing time first (STCPU) | Select the assignable task from the job having the shortest total processing time $T_j$ |

The Longest Critical Path First (LCPF) dispatching policy selects assignable tasks from jobs in decreasing order of critical path length $t_{u,j}$. The Critical Path Algorithm (CPA) dispatching policy considers the scheduling of the jobs as a single precedence DAG in which the jobs are all connected to an exit node. The exit node is a "dummy node" in the sense that it has zero processing time and is not a real task that is processed. The CPA arranges tasks such that each task from the pool of all jobs is arranged in a list according to the length of the longest path from the task to the exit node. The CPA selects the assignable task that has the longest path to the exit node.

The random task first (RANDOM) dispatching policy chooses an assignable task at random. The random task first dispatching policy may be seen as providing a benchmark for other scheduling policies since it requires the least amount of effort to implement and because it produces a schedule based upon chance. The job identifier order (FIRST) dispatching policy chooses assignable tasks from jobs according to job identifier order. The job priority order dispatching policy (PRIORITY) chooses tasks from jobs according to a priority assigned by the submitter of the job. For example, submitters may label jobs as having a high priority, a medium priority, or a low priority. (Note that the priorities are fundamentally different from the completion rewards $R_j$ used in the first step 202 (FIG. 5). Priorities are ordinals, which specify order; mathematical operations are not performed on ordinals. In contrast, the completion rewards $R_j$ are values for which mathematical operations such as sums and ratios are meaningful.) The job having shortest total processing time first (STCPU) dispatching policy chooses tasks from jobs in increasing order of total processing time $T_j$.

Alternatively, the dispatching policy is selected from dispatching policies listed in Table 4.

TABLE 4

| Dispatching Policy | Description |
| --- | --- |
| Shortest critical path first | Select the assignable task from the job having the shortest critical path length $t_{u,j}$ |
| Earliest assigned job first | Select the assignable task from the job that had a task assigned to a processor at an earliest time |
| Latest assigned job first | Select the assignable task from the job that most recently had a task assigned to a processor |
| Unassigned job first | Select the assignable task from a job that has yet to have a task assigned to a processor |
| Job having most remaining processing time first | Select the assignable task from the job having the most remaining processing time |
| Job having least remaining processing time first | Select the assignable task from the job having the least remaining processing time |
| Job having longest | Select the assignable task from the job having the |

TABLE 4-continued

| Dispatching Policy | Description |
| --- | --- |
| total processing time first | longest total processing time |
| Random job first | Select the assignable task from a job selected at random |
| Job having longest remaining critical path first | Select the assignable task from the job having longest remaining critical path first |
| Job having shortest remaining critical path first | Select the assignable task from the job having shortest remaining critical path first |
| Longest task first | Select from the longest assignable task first |

If the second sub-step 304 (FIG. 6) of selecting the particular task from the one or more assignable tasks selects two or more tasks, a tie-breaking criterion is used to select the assignable task. The tie breaking criterion is selected from a group including a task length criterion, a task length uncertainty criterion, a job length criterion, a random criterion, a fair share criterion, and a combination thereof.

An implementation of a dispatching policy includes a primary dispatching policy preferably selected from Table 3, or alternatively selected from Table 4, or some other primary dispatching policy. As a default, the primary dispatching policy comprises a non-delay dispatching policy. Any primary dispatching policy may be converted to a delay dispatching policy by adding a rule which describes circumstances for precluding assignment of an assignable task to an available processor. Further, a primary dispatching policy may be enhanced with one or more additional dispatching policies. For example, LCPF may be chosen as the primary dispatching policy, STCPU may be chosen as a secondary dispatching policy to break ties among jobs, and longest task first may chosen as a tertiary dispatching policy to break ties among tasks.

Additional rules may be added to a primary dispatching policy such as an affinity rule or a fair share rule, either of which may be implemented as a hard rule or a soft rule. For example, the affinity rule may be implemented as a hard rule that requires that once a task from a job is assigned to a cluster of processors all other tasks from the job must be assigned to the same cluster. Alternatively, the affinity rule may be implemented as a soft rule that describes circumstances under which multiple clusters may process tasks from a single job such as when it is determined that a cluster has no tasks to process, all jobs have been assigned to clusters, and one or more other clusters have a significant number of tasks to be processed.

According to an embodiment, the method of dispatching tasks of the present invention includes iteratively performing the first through third sub-steps, 302 through 306, using, for example, the LCPF dispatching policy.

Figure 7:
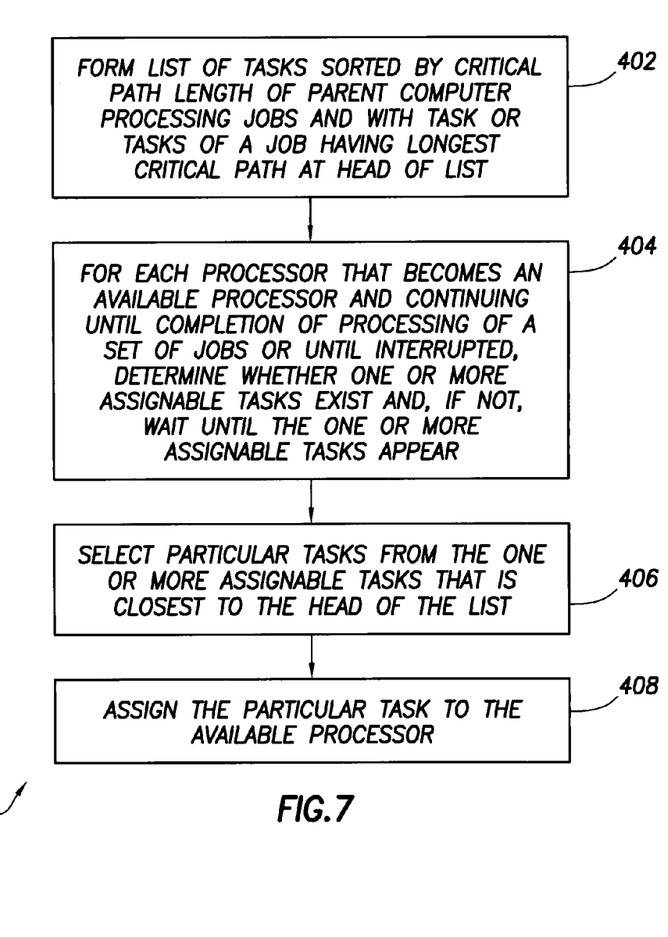
FIG. 7 also illustrates an embodiment of a method of dispatching tasks.

An embodiment of a method of dispatching tasks is illustrated as a flow chart in FIG. 7. The method 400 begins with a first step 402 of forming a list of tasks sorted by critical path length $t_{u,j}$ of parent computer processing jobs and with the task or tasks of a job having a longest critical path length at a head of the list. At least some of each of the parent computer processing jobs comprises a plurality of tasks and precedence constraints among the plurality of tasks. Ties between jobs or tasks with identical or approximately equal critical path length may be broken using a job specific criterion.

The method 400 continues with iterative performance of the second through fourth steps, 404 . . . 408. In the second step 404, for each processor that becomes an available processor within the multi-processor environment and continuing until completion of processing of a set of jobs (e.g., the selected jobs) or until interrupted, a determination is made as to whether one or more assignable tasks exist for assignment to the available processor and, if not, waiting until one or more assignable tasks appear. The one or more assignable tasks comprise the task or tasks that await a processor assignment, that do not await satisfaction of at least one of the precedence constraints, and that are not precluded from the processor assignment by a dispatching policy. For example, the dispatching policy may impose an affinity rule, a fair share rule, or some other dispatching rule. In the third step 406, a particular task is selected from the one or more assignable tasks that is closest to the head of the list. In the fourth step 408, the particular task is assigned to the available processor.

In an embodiment, the dynamic feedback scheduler 20 monitors performance of the processing of the selected jobs of the computing system 50 and, when appropriate, re-computes a schedule. Due to the uncertainty of processing time of jobs and tasks it may be beneficial to periodically adjust the selected jobs at a time or times between the release time and the due time. In an embodiment, the first step 202 further comprises generating an initial schedule. The initial schedule is determined, in part, based on predicted completion times for the various tasks as explained above. The monitor 28 acquires data from the computing system 50 that is used to assess how well the initial schedule is doing relative to the maximum allotted time D. If the initial schedule becomes significantly different from the actual execution of tasks, a re-scheduling flag is triggered, and the first step 202 may be performed again with updated information gathered from the monitor 28 including updated expectations of processing times and performance of processors as well as other computing resources.

The re-scheduling step may be triggered if jobs are processed faster than expected (a first event) or jobs are processed slower than expected (a second event). The first event (jobs processed faster than expected) triggers the re-scheduling step if the observed completion time $o_{g,j}^k$ of stage g of job j is less than or equal to a minimum time threshold, $o_{g,j}^k \leq t_{g,j}^{min}$. The second event (jobs processed slower than expected) triggers the re-scheduling step if the observed completion time $o_{g,j}^k$ of stage g of job j is greater than or equal to a maximum time threshold, $o_{g,j}^k \geq t_{g,j}^{max}$, and the observed completion time $o_{g,j}^k$ is close to the due time D. The latter may be given by $|D-o_{g,j}^k|<\epsilon$, where $\epsilon$ is a threshold time period. The observed completion times, $o_{g,j}^k$, are measured or otherwise acquired by monitor 28. In other embodiments, the monitor 28 acquires a sample of completion times of various tasks within a job and generate a probability distribution of makespan and completion time of the current schedule. Consequently, the controller 22 may use the probability distribution function to determine an estimated completion time or a probability distribution of estimated completion times. Then, the controller may determine whether the estimated probability of the completion time is less than or equal to a threshold value.

The first event (jobs processed faster than expected) is an easier triggering event to meet than the second event (jobs processed slower than expected) because adding more jobs to a queue does not affect performance. In contrast, the second event (jobs processed slower than expected) is a more difficult triggering event to meet than the first event (jobs processed faster than expected) because long tasks should not be preempted, resources cannot be added to speed up a slow task or tasks and, since killing tasks wastes resources, tasks should not be killed. If the re-scheduling step is triggered by the second event (jobs processed slower than expected), one or more jobs having a slow task or tasks may be removed from the queue and not considered in the re-scheduling step.

In at least some embodiments of the invention, the controller 22 (FIG. 1) uses the same or similar mathematical program as that used by the planner 24 to determine whether the currently running schedule is too far behind to meet the deadline, D. The action performed by the controller 22 to make this determination may be performed at predefined points in time (e.g., at 4 pm) or at a predefined or programmable time intervals (e.g., once per hour). As explained previously, various input and derived values for the mathematical program to compute the schedule are listed in Table 2. Of those values, the following values are updated from their initial values when used by controller 22 to determine if the schedule should be re-computed: D, $R_j$, $T_j$, $t_{u,j}$, $LC_j$, $L_j$, cent, and $H_k$.

The value D initially was the total amount of computing system 50 time that the initial schedule had to use. As some amount of time has passed since the jobs were begun to be dispatched and run on the computing system, the value D is updated to reflect the remaining time. For example, if the value of D was initially 10 hours and 2 hours have now passed, then D will be updated to a value 8 hours, assuming that no additional computing system 50 time is permitted to be used. The completion reward value $R_j$ represents the completion reward for job j if it is completed on time. The completion reward value can be updated if desired. The total processing time ($T_j$) and critical path length of job j ($t_{u,j}$) are recalculated based on the actual processing time for completed tasks (as determined by the monitor 28) and new estimates for tasks that are not yet completed. The job lateness cost per unit of lateness of critical path ($LC_j$) and cost per unit time of lateness of any cluster value (cent) can be updated if desired. The processing time capacity at cluster k ($H_k$) is updated based on processor availability which takes into account, for example, known processor outages.

As explained previously, the decision variables include the selection decision variable ($z_j$) and the placement decision variable ($y_{j,k}$). The selection decision variable was initially set by planner 24 for each job j to a value 1 if job j was selected to be included in the initial schedule and 0 if job j was excluded from the schedule. When controller 22 periodically assesses whether the original selection of jobs can still permit the selected jobs to be completed by the deadline D, all of the z variables are set to the original output of the planner 24. That is, a job that was selected previously will have its z value set to 1, whereas a job that was not selected previously will have its z value set to 0. Thus, rather than having the mathematical program determine which jobs to select and which to exclude, the program is run with certain jobs pre-selected in accordance with the selection decision made initially by the planner 24. The mathematical program is then run on the controller 22 and the program will determine whether the jobs whose selection has been forced can still be completed by the new deadline D given the various constraints and other parameters noted above.

It is possible that the schedule is proceeding faster than previously estimated and, if so, that one or more jobs previously excluded can be now be included to be performed on computing system 50. To determine if there is one or more additional jobs that can be included, the selection decision variable z is set to a value 1 for all jobs that were initially selected and left unconstrained for all other jobs. The mathematical program is run on controller 22 and the program will determine if additional jobs can be completed before the deadline D.

If it turns out that the initial schedule is not feasible (i.e., that all previously selected jobs cannot be completed by the deadline D) or if it desired to know if a new selection of jobs could produce a better result (e.g., a higher reward value), then the z value can be set (forced) to 1 only for those jobs that have already completed. All other jobs, either those previously selected but not yet completed or those previously excluded, will have their z values left unconstrained. The mathematical program is run on controller 22 and the program will find a new set of jobs to be selected.

The placement decision variables ($y_{j,k}$) indicate which of the jobs are assigned to which of the cluster of processors in the computing system 50. If desired, the controller 22 can run the mathematical program with the same or different set of placement decision variables when determining whether to have the schedule re-computed. For example, if a job was originally scheduled to be executed on cluster k and it is desired for that job not to be reassigned to a different cluster, the placement decision variable for that particular job can be fixed (forced) so as to cause the job to be assigned to the same cluster. However, if adhering to the previously assigned cluster is not necessary, then the controller 22 can let the mathematical program set the placement decision variable for a particular job or all jobs.

In other embodiments, other factors can be examined to determine whether to re-compute the initial schedule. Re-computing the schedule based on an analysis of the objective function, affinity constraints, and/or the fair-share constraints can be performed. For example, if the objective function was to maximize a particular reward value and, using the mathematical program, it is determined that the previously computed reward can no longer be obtained (relative to, if desired, a threshold), then the schedule can be re-computed. Alternatively or additionally, if is determined that the affinity and/or fair-share constraints are violated (by more than a threshold amount if desired), the schedule can also be re-computed.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
computing an initial schedule of jobs to be run on a computing system using a mathematical program that maximizes a total reward associated with jobs that are timely completed while satisfying precedence constraints among tasks that comprise the jobs;
monitoring said computing system; and
based on the monitoring, determining, using the mathematical program used to compute the initial schedule, whether the initial schedule should be re-computed;
wherein computing the initial schedule includes the mathematical program determining a state for job selection decision variables that dictate which jobs are selected to be part of the initial schedule, and wherein determining whether the initial schedule should be re-computed comprises forcing the job selection decision variables to said state that was computed while computing the initial schedule.

2. The method of claim 1 wherein computing the initial schedule includes providing an input value to the mathematical program and determining whether the initial schedule should be re-computed comprises changing said input value.

3. The method of claim 2 wherein the input value comprises an amount of time that can be used to run the scheduled jobs.

4. The method of claim 1 wherein determining whether the initial schedule should be re-computed comprises leaving unconstrained the job selection decision variable for any job that was not selected.

5. The method of claim 1 wherein determining whether the initial schedule should be re-computed comprises forcing the job selection decision variables to select only those jobs that have been completed and leaving unconstrained the job selection decision variable for all other jobs.

6. The method of claim 1 wherein the computing system comprises a plurality of processors and wherein computing the initial schedule includes the mathematical program computing placement decision variables to identify which processors are to be assigned to which of the initially scheduled jobs, and further wherein determining whether the initial schedule should be re-computed comprises forcing the placement decision variables to be as was computed by the mathematical program while computing the initial schedule.

7. The method of claim 1 wherein the computing system comprises a plurality of processors and wherein computing the initial schedule includes the mathematical program computing placement decision variables to identify which processors are to be assigned to which of the initially scheduled jobs, and further wherein determining whether the initial schedule should be re-computed comprises leaving unconstrained the placement decision variables.

8. The method of claim 1 wherein monitoring said computing system comprises determining a completion time of a task within a job.

9. The method of claim 8 wherein computing the initial schedule comprises using an estimate of task completion time and wherein determining whether the initial schedule should be re-computed comprises using an update of said estimate task completion time from said monitoring.

10. The method of claim 1 further comprising re-computing said schedule if the initial schedule cannot be fully completed by a deadline.

11. The method of claim 1 further comprising re-computing said schedule if the initial schedule is estimated to take more than a threshold amount of time past a deadline to complete.

12. The method of claim 1 further comprising re-computing said schedule if the initial schedule will be completed more than a threshold amount of time prior to a deadline.

13. The method of claim 1 wherein monitoring said computing system comprises determining a probability distribution of completion times of a plurality of tasks comprising a job and determining whether the initial schedule should be re-computed based on said probability distribution.

14. A computer readable medium containing software that, when executed by a processor, causes the processor to perform a method for assessing whether an initial schedule of jobs should be re-computed after said initial schedule has been computed and begun to run, said method comprising:
computing the initial schedule of jobs to be run on a computing system using a mathematical program that maximizes a total reward associated with jobs that are timely completed while satisfying precedence constraints among tasks that comprise the jobs;
monitoring said computing system; and
based on the monitoring, determining, using the mathematical program used to compute the initial schedule, whether the initial schedule should be re-computed;
wherein computing the initial schedule includes the mathematical program computing a state for job selection decision variables that dictate which jobs are selected to be part of the initial schedule, and wherein determining whether the initial schedule should be re-computed comprises forcing the job selection decision variables to said state that was computed while computing the initial schedule.

15. The computer readable medium of claim 14 wherein computing the initial schedule includes providing a deadline to the mathematical program and determining whether the initial schedule should be re-computed comprises changing deadline based on how much time has expired since the initial schedule began to run.

16. The computer readable medium of claim 14 wherein determining whether the initial schedule should be re-computed comprises leaving unconstrained the job selection decision variable for any job that was not selected.

17. The computer readable medium of claim 14 wherein determining whether the initial schedule should be re-computed comprises forcing the job selection decision variables to select only those jobs that have been completed and leaving unconstrained the job selection decision variable for all other jobs.

18. The computer readable medium of claim 14 wherein the computing system comprises a plurality of processors and wherein computing the initial schedule includes the mathematical program computing placement decision variables to identify which processors are to be assigned to which of the initially scheduled jobs, and further wherein determining whether the initial schedule should be re-computed comprises forcing the placement decision variables to be as was computed by the mathematical program while computing the initial schedule.

19. The computer readable medium of claim 14 wherein the computing system comprises a plurality of processors and wherein computing the initial schedule includes the mathematical program computing placement decision variables to identify which processors are to be assigned to which of the initially scheduled jobs, and further wherein determining whether the initial schedule should be re-computed comprises leaving unconstrained the placement decision variables.

20. The computer readable medium of claim 14 wherein monitoring said computing system comprises determining a completion time of a task within a job.

21. The computer readable medium of claim 20 wherein computing the initial schedule comprises using an estimate of task completion time and wherein determining whether the initial schedule should be re-computed comprises using an update of said estimate task completion time from said monitoring.

22. The computer readable medium of claim 14 further comprising re-computing said schedule if the initial schedule cannot be fully completed by a deadline.

23. The computer readable medium of claim 14 further comprising re-computing said schedule if the initial schedule is estimated to take more than a threshold amount of time past a deadline to complete.

24. The computer readable medium of claim 14 further comprising re-computing said schedule if the initial schedule will completed more than a threshold amount of time prior to a deadline.

25. A system, comprising:
a processor; and
storage coupled to said processor, said storage comprising an executable planner, monitor, and controller;
said planner computes an initial schedule of jobs to run on a computing system, said planner computes said initial schedule using a mathematical program that maximizes a total reward associated with jobs that are timely completed while satisfying precedence constraints among tasks that comprise the jobs;

said monitor monitors the computing system; and said controller, while said initial schedule runs on the computing system, determines whether said initial schedule should be re-calculated based, at least in part, on information from said monitor regarding said computing system;

wherein said planner uses the mathematical program to compute the initial schedule by determining a state for job selection decision variables that dictate which jobs are selected to be part of the initial schedule, and wherein the controller determines whether the initial schedule should be re-computed by forcing the job selection decision variables to said state that was computed while computing the initial schedule.

26. The system of claim 25 wherein each job comprises one or more jobs and said information comprises an amount of time it takes for individual tasks within a job to complete.

27. The system of claim 26 wherein the planner estimates an amount of time required to complete each task and said controller re-estimates the amount of time based, at least in part, on said information.

28. The system of claim 25 wherein said planner computes the initial schedule by providing a deadline to the mathematical program and said controller determines whether the initial schedule should be re-computed by changing the deadline based on how much time has expired since the initial schedule began to run.

29. The system of claim 25 wherein when said planner computes the initial schedule, said planner computes job selection decision variables that dictate which jobs are selected to be part of the initial schedule, and wherein said controller determines whether the initial schedule should be re-computed by forcing the job selection decision variables to select only those jobs that were selected by said planner initially and by leaving unconstrained the job selection decision variable for any job that was not selected by the planner initially.

30. The system of claim 25 wherein when said planner computes the initial schedule, said planner computes job selection decision variables that dictate which jobs are selected to be part of the initial schedule, and wherein said controller determines whether the initial schedule should be re-computed by forcing the job selection decision variables to select only those jobs that have been completed and by leaving unconstrained the job selection decision variable for all other jobs.

31. The system of claim 25 wherein the computing system comprises a plurality of processors and wherein said planner computes the initial schedule by computing placement decision variables to identify which processors are to be assigned to which of the initially scheduled jobs, and wherein said controller determines whether the initial schedule should be re-computed by forcing the placement decision variables to be as was computed by said planner initially.

32. The system of claim 25 wherein the computing system comprises a plurality of processors and wherein said planner computes the initial schedule by computing placement decision variables to identify which processors are to be assigned to which of the initially scheduled jobs, and wherein said controller determines whether the initial schedule should be re-computed by leaving unconstrained the placement decision variables.

33. The system of claim 25 wherein said controller causes said schedule to be re-computed if the initial schedule cannot be fully completed by a deadline.

34. The system of claim 25 wherein said controller causes said schedule to be re-computed if the initial schedule is estimated to take more than a threshold amount of time past a deadline to complete.

35. The system of claim 25 wherein said controller causes said schedule to be re-computed if the controller estimates that the initial schedule will be completed more than a threshold amount of time prior to a deadline.

36. The system of claim 25 wherein said information from said monitor that is used by said controller to determine whether to re-calculate the initial schedule comprises a change in an objective function that is used by the planner to compute the initial schedule.

37. The system of claim 25 wherein said information from said monitor that is used by said controller to determine whether to re-calculate the initial schedule comprises a violation of an affinity or fair-share resource constraint.

38. A system, comprising:

means for using a scheduling algorithm to schedule jobs to run on a computing system, said means for using computes schedules the jobs using a mathematical program that maximizes a total reward associated with jobs that are timely completed while satisfying precedence constraints among tasks that comprise the jobs;

means for monitoring said computing system; and means for determining whether the schedule should be re-computed using said scheduling algorithm while said scheduled jobs are running on said computing system;

wherein said means for using computes the initial schedule by using the mathematical program to compute a state for job selection decision variables that dictate which jobs are selected to be part of the initial schedule, and wherein determining the means for determining determines whether the initial schedule should be re-computed by forcing the job selection decision variables to said state that was computed while computing the initial schedule.

39. A method, comprising:

using a mathematical program to select jobs to form an initial schedule to run on a computing system, each job comprising one or more tasks, at least one job not being selected to form the initial schedule, said mathematical program selects the jobs to form the initial schedule by maximizing a total reward associated with jobs that are timely completed while satisfying precedence constraints among tasks that comprise the jobs;

monitoring said computing system while said initially scheduled jobs are running on said computing system; and based at least in part on the monitoring, determining, using the mathematical program used to compute the initial schedule, whether the initial schedule should be re-computed;

wherein a deadline used to form the initial schedule is varied when determining whether the initial schedule should be re-computed; and wherein job selection variables are computed to form the initial schedule, the job selection variables dictate which jobs are selected and which are not selected for the initial schedule, and wherein when determining whether the initial schedule should be re-computed, the method comprising forcing at least some of the job selection variables to a predetermined state.

* * * * *

UNITED STATES PATENT AND TRADEMARK OFFICE
CERTIFICATE OF CORRECTION

| | | |
|---|---|---|
| PATENT NO. | : 7,958,507 B2 | Page 1 of 1 |
| APPLICATION NO. | : 11/154305 | |
| DATED | : June 7, 2011 | |
| INVENTOR(S) | : Cipriano A. Santos et al. | |

It is certified that error appears in the above-identified patent and that said Letters Patent is hereby corrected as shown below:

In column 18, line 15, in Claim 17, after "wherein" insert -- computing the initial schedule includes the mathematical program computing a state for job selection decision variables that dictate which jobs are selected to be part of the initial schedule, and wherein --.

Signed and Sealed this
Twentieth Day of March, 2012

David J. Kappos
*Director of the United States Patent and Trademark Office*